(12) United States Patent
Hiramatsu

(10) Patent No.: US 7,914,415 B2
(45) Date of Patent: Mar. 29, 2011

(54) AUTOMATIC TRANSMISSION

(75) Inventor: Takeo Hiramatsu, Nagaokakyo (JP)

(73) Assignee: Jatco Ltd, Fuji-shi (JP)

( * ) Notice: Subject to any disclaimer, the term of this patent is extended or adjusted under 35 U.S.C. 154(b) by 396 days.

(21) Appl. No.: 12/268,507

(22) Filed: Nov. 11, 2008

(65) Prior Publication Data

US 2009/0143184 A1  Jun. 4, 2009

(30) Foreign Application Priority Data

Nov. 29, 2007  (JP) .................. 2007-309536

(51) Int. Cl.
*F16H 3/44* (2006.01)
*F16H 3/62* (2006.01)

(52) U.S. Cl. ............. 475/323; 475/275; 475/284

(58) Field of Classification Search ............ 475/269, 475/275, 276, 278, 280, 281, 284, 285, 286, 475/287, 296, 323, 324, 325, 326, 330
See application file for complete search history.

(56) References Cited

U.S. PATENT DOCUMENTS

| | | | |
|---|---|---|---|
| 6,572,507 B1 * | 6/2003 | Korkmaz et al. | 475/276 |
| 6,648,791 B2 | 11/2003 | Kao et al. | |
| 6,709,358 B2 * | 3/2004 | Raghavan et al. | 475/275 |
| 6,743,146 B2 * | 6/2004 | Usoro et al. | 475/296 |
| 7,294,088 B2 * | 11/2007 | Shim et al. | 475/276 |
| 2008/0103014 A1 * | 5/2008 | Gumpoltsberger | 475/276 |
| 2010/0048343 A1 * | 2/2010 | Boss et al. | 475/271 |

FOREIGN PATENT DOCUMENTS

JP 2004-176765 A 6/2004

* cited by examiner

*Primary Examiner* — David D Le
*Assistant Examiner* — Michael Gonzalez
(74) *Attorney, Agent, or Firm* — Global IP Counselors, LLP

(57) ABSTRACT

An automatic transmission is provided with three planetary gear units and five friction elements. The first planetary gear unit includes a first sun gear that is always fixed, a first carrier supporting a first pinion in meshed engagement with the first sun gear and a first ring gear in meshed engagement with the first pinion. The first to fifth friction elements are operatively arranged with respect to the first, second and third planetary gear units to selectively establish at least seven forward speeds and one reverse speed by combining simultaneous engagement of two out of five friction elements for transmitting torque from the input shaft to the output shaft.

3 Claims, 3 Drawing Sheets

$\rho_1 = Z_{S1}/Z_{R1} = 0.5 \qquad \rho_2 = Z_{S2}/Z_{R2} = 0.5 \qquad \rho_3 = Z_{S3}/Z_{R3} = 0.4$

| Gear | A | B | C | D | E | Formula of speed reduction ratio $i = nT/n2$ | Speed reduction ratio | 1/Speed reduction ratio |
|---|---|---|---|---|---|---|---|---|
| 1st Speed | O | O | | | | $i_1 = (1 + \rho_3 + (1 + \rho_1)\rho_2)/\rho_3$ | 5.375 | 0.186 |
| 2nd Speed | O | | | | | $i_2 = (1 + \rho_3)/\rho_3$ | 3.500 | 0.286 |
| 3nd Speed | | O | O | | | $i_3 = 1 + \rho_1/(\rho_3(\rho_1 + \rho_2 + \rho_3 + \rho_1\rho_2))$ | 2.000 | 0.500 |
| 4th Speed | | | O | O | | $i_4 = 1 + \rho_1/(\rho_2(1+\rho_1) + \rho_3(\rho_1+\rho_2+\rho_1\rho_2))$ | 1.400 | 0.714 |
| 5th Speed | | | O | | O | $i_5 = 1$ | 1.000 | 1.000 |
| 6th Speed | | O | | | O | $i_6 = 1 - \rho_1/((1+\rho_1)(1+\rho_1+\rho_2+\rho_3+\rho_1\rho_2))$ | 0.811 | 1.233 |
| 7th Speed | O | | | | O | $i_7 = (1+\rho_3)/(1+\rho_3)$ | 0.737 | 1.357 |
| Reverse | O | | | O | | $i_R = (1+\rho_3)/(\rho_3 - \rho_2 - \rho_1\rho_2)$ | -4.000 | -0.250 |

Ratio Coverage: 7.29   (R/1) = 0.744

| | Speed reduction ratio | 1/Speed reduction ratio (normalized at highest step) | Difference between steps |
|---|---|---|---|
| 1st Speed | 5.375 | 0.137 | 0.137 |
| 2nd Speed | 3.500 | 0.211 | 0.073 |
| 3rd Speed | 2.000 | 0.369 | 0.158 |
| 4th Speed | 1.400 | 0.526 | 0.158 |
| 5th Speed | 1.000 | 0.737 | 0.211 |
| 6th Speed | 0.811 | 0.909 | 0.172 |
| 7th Speed | 0.737 | 1.000 | 0.091 |
| | | Standard Deviation | 0.047 |

Fig. 3

# AUTOMATIC TRANSMISSION

CROSS-REFERENCE TO RELATED APPLICATIONS

This application claims priority to Japanese Patent Application No. 2007-309536, filed on Nov. 29, 2007. The entire disclosure of Japanese Patent Application No. 2007-309536 is hereby incorporated herein by reference.

BACKGROUND OF THE INVENTION

1. Field of the Invention

The present invention generally relates to an automatic transmission. More specifically, the present invention relates to a stepped automatic transmission that can be used as a transmission in a vehicle.

2. Background Information

In the past, automatic transmissions have been proposed in which three groups of planetary gears are used to establish seven forward speeds. For example, automatic transmissions of this type are disclosed in Japanese Laid-Open Patent Publication No. 2004-176765 and U.S. Pat. No. 6,648,791. In particular, Japanese Laid-Open Patent Publication No. 2004-176765 discloses a progressive seven-speed automotive transmission that has an advantage in transmission efficiency and reduced gear noise by uses three groups of durable, single-pinion planetary gears and six friction elements without the pinion gear being reduced in diameter. Similarly, U.S. Pat. No. 6,648,791 discloses an automotive transmission in which three groups of single-pinion planetary gears and five friction elements are used to establish six to eight forward speeds In view of the above, it will be apparent to those skilled in the art from this disclosure that there exists a need for an improved automatic transmission. This invention addresses this need in the art as well as other needs, which will become apparent to those skilled in the art from this disclosure.

SUMMARY OF THE INVENTION

In the automatic transmission disclosed in Japanese Laid-Open Patent Publication No. 2004-176765, at least six friction elements are needed to achieve seven forward speeds. Therefore, the number of friction elements is high, bringing about the problem of a larger number of parts and increased axial dimensions. In the case of the automatic transmission disclosed in U.S. Pat. No. 6,648,791, five friction elements are provided to achieve seven forward speeds, bringing about a reduction in the number of friction elements and in the number of parts in comparison with the automatic transmission disclosed in Japanese Laid-Open Patent Publication No. 2004-176765.

However, the automotive transmission disclosed in U.S. Pat. No. 6,648,791 (see, e.g., FIGS. 23 and 24) has a problem in that numerous coupling members pass through the area at the outside diameter of the planetary gear, resulting in reduced fuel efficiency. For example, in FIG. 23 of U.S. Pat. No. 6,648,791, the member that passes through the area at the outside diameter of the ring gear of the middle planetary gear is a three-layered structure. Because of this, an automatic transmission generally uses centrifugal force directed from the axial center to discharge lubricating oil, which passes through the parts that need lubrication. The lubricating oil is recovered in the oil pan provided at the bottom part of the automotive transmission. However, when, for example, a coupling member referred to as a drum member in an area at the outside diameter of the planetary gear has a multilayer structure, the lubricating oil tends to accumulate inside the above-mentioned member. Thus, in this configuration numerous parts rotate while the vehicle is traveling, resulting in increased friction and reduced fuel efficiency.

On the other hand, the members that travel through the area at the outside diameter of the planetary gear shown in FIG. 25 of U.S. Pat. No. 6,648,791 are two-layered and have a structure in which the lubricating oil does not accumulate as easily as in FIG. 23 of U.S. Pat. No. 6,648,791, but the area at the inside diameter of the sun gear in planetary gear on the side of the input shaft has a multi-axial structure, i.e., at most a tri-axial structure. The resulting problem is that the dimensions of the sun gear are restricted and the gear ratio of the planetary gear on the side of the input shaft has a lower degree of freedom. An attempt to maintain the gear ratio of the planetary gear brings about the problem of increased dimensions for the planetary gear and increased external dimensions for the automatic transmission.

In view of the state of the known technology, an automatic transmission is provided with three groups of simple planetary gear units and five friction elements to establish seven forward speeds. One object is to provide such an automatic transmission capable of minimizing the number of members that pass through the area at the outside diameter of the planetary gears. Another the object to provide such an automatic transmission capable of minimizing the number of shafts that pass through the area at the inside diameter of the planetary gears.

In order to accomplish the above-mentioned objects, an automatic transmission is provided that basically comprises an input shaft, an output shaft, a first planetary gear unit, a second planetary gear unit, a third planetary gear unit, a first friction element, a second friction, a third friction element, a fourth friction and a fifth friction element. The first planetary gear unit includes a first sun gear that is always fixed, a first carrier supporting a first pinion in meshed engagement with the first sun gear and a first ring gear in meshed engagement with the first pinion. The second planetary gear unit includes a second sun gear, a second carrier supporting the second pinion in meshed engagement with the second sun gear and a second ring gear in meshed engagement with the second pinion. The first carrier and the second ring gear are connected to form a rotating member. The third planetary gear unit includes a third sun gear that is always connected to the input shaft, a third carrier supporting a third pinion in meshed engagement with the third sun gear and that is always connected to the output shaft and a third ring gear in meshed engagement with the third pinion. The first friction element is arranged to selectively stop rotation of the second carrier. The second friction element is arranged to selectively connect the second sun gear and the third carrier. The third friction element is arranged to selectively connect the second carrier and a first rotating member formed by the first and third ring gears being connected rotate together as a unit. The fourth friction element is arranged to selectively connect the second sun gear and the third sun gear. The fifth friction element is arranged to selectively connect the second carrier and the third sun gear. The first to fifth friction elements are operatively arranged with respect to the first, second and third planetary gear units to selectively establish at least seven forward speeds and one reverse speed by combining simultaneous engagement of two out of five friction elements for transmitting torque from the input shaft to the output shaft.

These and other objects, features, aspects and advantages of the present invention will become apparent to those skilled in the art from the following detailed description, which, taken in conjunction with the annexed drawings, discloses a preferred embodiment of the present invention.

BRIEF DESCRIPTION OF THE DRAWINGS

Referring now to the attached drawings which form a part of this original disclosure:

FIG. 2 is an example of a clutch engagement operating chart showing the speed reduction ratios of the friction elements in the automatic transmission according to the illustrated embodiment; and FIG. 3 is a table showing the difference between the steps according to the illustrated embodiment.

DETAILED DESCRIPTION OF THE PREFERRED EMBODIMENTS

Figure 1:
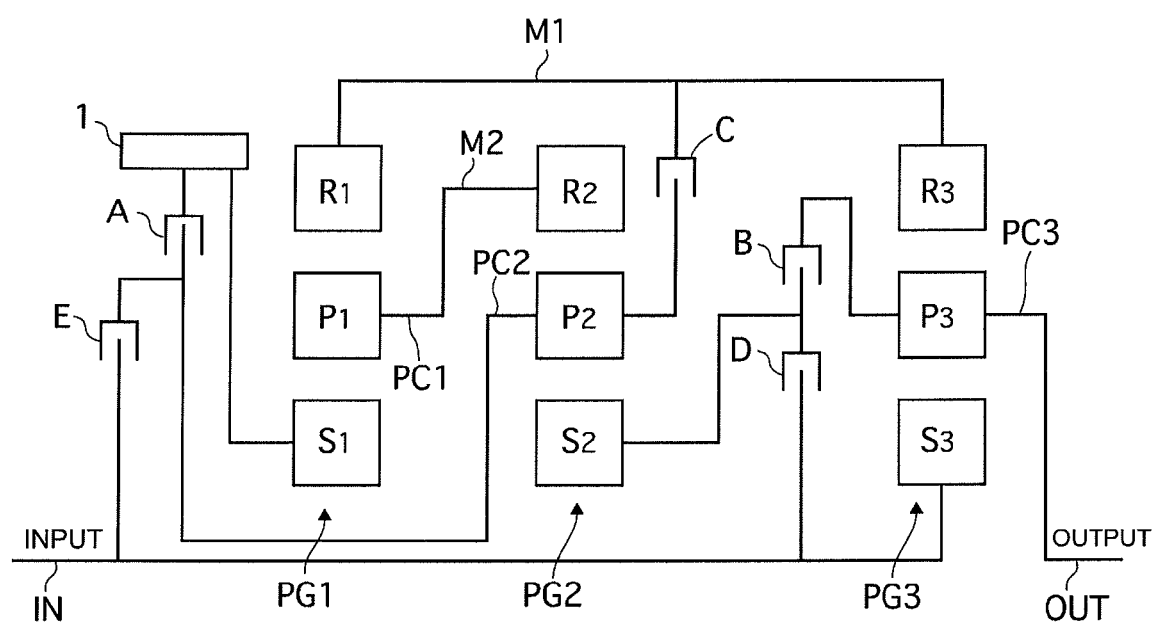
FIG. 1 is simplified schematic view (skeleton diagram) of an automatic transmission according to an illustrated embodiment.

Selected embodiments of the present invention will now be explained with reference to the drawings. It will be apparent to those skilled in the art from this disclosure that the following descriptions of the embodiments of the present invention are provided for illustration only and not for the purpose of limiting the invention as defined by the appended claims and their equivalents.

Referring initially to FIG. 1, an automatic transmission is schematically illustrated in accordance with an illustrated embodiment. FIG. 2 is a clutch engagement operating chart showing the speed reduction ratios of the friction elements in the automatic transmission according to illustrated embodiment. The automatic transmission according to illustrated embodiment uses three single-pinion planetary gear units in its gear train. In particular, the automatic transmission includes a first planetary gear unit PG1, a second planetary gear unit PG2 and a third planetary gear unit PG3, as shown in FIG. 1. The first planetary gear unit PG1 includes a first sun gear S1, a first ring gear R1 and a first pinion gear P1 in meshed engagement with the first sun gear S1 and the first ring gear R1. The second planetary gear unit PG2 has a second sun gear S2, a second ring gear R2 and a second pinion gear P2 in meshed engagement with the second sun gear S2 and the second ring gear R2. The third planetary gear unit PG3 has a third sun gear S3, a third ring gear R3 and a third pinion gear P3 in meshed engagement with the third sun gear S3 and the third ring gear R3. The first, second and third pinion gears P1, P2 and P3 are rotatably supported on first, second and third carriers PC1, PC2 and PC3, respectively. Thus, three groups of planetary gear units PG1, PG2 and PG3 are disposed in sequential order from an input shaft IN to an output shaft OUT of the automatic transmission.

The first ring gear R1 and the third ring gear R3 are always connected together to rotate as a unit and constitute a rotating member M1. The first carrier PC1 and the second ring gear R2 are always connected together to rotate as a unit and constitute a rotating member M2. The first sun gear S1 is always fixed or locked to a transmission case 1. The input shaft IN is always coupled with the third sun gear S3 to always rotate therewith. The output shaft OUT is always coupled to the third carrier PC3 to always rotate therewith.

The automatic transmission is provided with a first friction member A, a second member B, a third member C, a fourth member D and a fifth member E. The first friction member A is a brake, while the second, third, fourth and fifth friction members B, C, D and E are four clutches. The first friction member A is provided between the second carrier PC2 and the transmission case 1, and selectively locks the rotation of the second carrier PC2. The second friction member B is provided between the second sun gear S2 and the third carrier PC3, and selectively couples the second sun gear S2 with a third carrier PC3. The third friction member C is provided between the second carrier PC2 and the first rotating member M1, and selectively couples the second carrier PC2 and the first rotating member M1 (first ring gear R1 and third ring gear R3). The fourth friction member D is provided between the second sun gear S2 and the third sun gear S3, and selectively couples the second sun gear S2 and the third sun gear S3. The fifth friction member E is provided between the second carrier PC2 and the third sun gear S3 and selectively couples the second carrier PC2 and the third sun gear S3.

The output shaft OUT is provided with an output gear and the like and transmits rotational driving force to a drive wheel via a differential gear and a drive shaft (not shown). In the case of example 1, the output shaft OUT is not blocked by another member or the like, and can be used both in a front-wheel-drive vehicle and in a rear-wheel-drive vehicle.

The coupling (engagement) relationship among the friction elements in each gear step is described using the clutch engagement operating chart in FIG. 2 (gearshift control unit). In the clutch engagement operating chart of FIG. 2, an ◯ mark in the chart indicates engagement, and a blank space indicates release.

Forward movement will first be described. A first speed is established by engaging the first friction element A and the second friction element B. A second speed is established by engaging the first friction element A and the third friction element C. A third speed is established by engaging the second friction element B and the third friction element C. A fourth speed is established by engaging the third friction element C and the fourth friction element D. A fifth speed is established by engaging the third friction element C and the fifth friction element E. A sixth speed is established by engaging the second friction element B and the fifth friction element E. A seventh speed is established by engaging the first friction element A and the fifth friction element E. A reverse speed is established by engaging the first friction element A and the fourth friction element D.

A specific example of the speed reduction ratios according to illustrated embodiment is described next using FIG. 2. The example will be described with reference to a case where the gear ratio of the first planetary gear unit PG1 is $\rho_1 = Z_{S1}/Z_{R1} = 0.50$, the gear ratio of the second planetary gear unit PG2 is $\rho_2 = Z_{S2}/Z_{R2} = 0.50$ and the gear ratio of the third planetary gear unit PG3 is $\rho_3 = Z_{S3}/Z_{P3} = 0.40$. Here, $Z_{S1}$, $Z_{S2}$, $Z_{S3}$, $Z_{R1}$, $Z_{R2}$ and $Z_{R3}$ indicate the number of teeth of each respective gear.

The speed reduction ratio $i_1$ of the first forward speed is expressed by the formula $i_1 = (1+\rho_3+(1+\rho_1)\rho_2)/\rho_3$. When a specific numeric value is substituted, the gear ratio $i_1$ of the first forward speed is $i_1 = 5.375$, and the inverse speed reduction ratio is 0.186.

The speed reduction ratio $i_2$ of the second forward speed is expressed by the formula $i_2 = (1+\rho_3)/\rho_3$. When a specific numeric value is substituted, the gear ratio $i_2$ of the second forward speed is $i_2 = 3.500$, and the inverse speed reduction ratio is 0.286.

The speed reduction ratio $i_3$ of the third forward speed is expressed by the formula $i_3 = 1+\rho_1/(\rho_3(\rho_1+\rho_2+\rho_1\rho_2))$. When a specific numeric value is substituted, the gear ratio $i_3$ of the third forward speed is $i_3 = 2.000$, and the inverse speed reduction ratio is 0.500.

The speed reduction ratio $i_4$ of the fourth forward speed is expressed by the formula $i_4 = 1+\rho_1/(\rho_2(1+\rho_1)+\rho_3(\rho_1+\rho_2+$ $\rho_1\rho_2$)). When a specific numeric value is substituted, the gear ratio $i_4$ of the fourth forward speed is $i_4=1.400$, and the inverse speed reduction ratio is 0.714.

The speed reduction ratio $i_5$ of the fifth forward speed is expressed by the formula $i_5=1.0$. Even without substituting a specific numeric value, it is apparent that the speed reduction ratio $i_5$ of the fifth forward speed is $i_5=1.000$, and the inverse speed reduction ratio is 1.000.

The speed reduction ratio $i_6$ of the sixth forward speed is expressed by the formula $i_6=1-\rho_1/(1+\rho_1+\rho_2+\rho_3+\rho_1\rho_2)$. When a specific numeric value is substituted, the speed reduction ratio $i_6$ of the sixth forward speed is $i_6=0.811$, and the inverse speed reduction ratio is 1.233.

The speed reduction ratio $i_7$ of the seventh forward speed is expressed by the formula $i_7=(1+\rho_3)/(1+\rho_1+\rho_3)$. When a specific numeric value is substituted, the speed reduction ratio $i_7$ of the seventh forward speed is $i_7=0.737$, and the inverse speed reduction ratio is 1.357.

The speed reduction ratio $i_R$ of the reverse speed is expressed by the formula $i_R=(1+\rho_3)/(\rho_3-\rho_2-\rho_1\rho_2)$. When a specific numeric value is substituted, the speed reduction ratio $i_R$ of the reverse speed is $i_R=-4.000$, and the inverse speed reduction ratio is $-0.250$.

The characteristics of the speed reduction ratio according to illustrated embodiment will next be described using FIG. 3. FIG. 3 is a table that shows the mutual relationships between the gearshifting steps provided by the automatic transmission according to illustrated embodiment. Specifically, it is appropriate to evaluate the ratio between the steps by determining how close V1000 (corresponding to the vehicle speed range covered at each gearshifting step (e.g., $1^{st}$ gear—0 to 20 km; $2^{nd}$ gear—20 to 40 km, etc.), with the prescribed throttle opening) is to an arithmetic progression. Specifically, if V1000 is allocated arithmetically, the range of the speed which each gear shift covers will become equal, so that when the throttle valve is fixed and the acceleration is fixed, the speed will change always at the same interval. In particular, it becomes possible to obtain an automatic transmission in which cadenced upshifting can be achieved, in which the change gear ratio can be easily selected on ascending and descending roads, and which has excellent drivability properties.

To quantitatively determine the divergence of V1000 from an arithmetic progression, a method can be adopted in which the inverse speed reduction ratio of the maximum gearshifting step is set to be 1 to normalize the inverse speed reduction ratio of each of the gearshifting steps, and the divergence of these values from the arithmetic progression is quantitatively determined. It can be seen that the standard deviation in the automatic transmission of illustrated embodiment is 0.047, and is very small.

Effects based on entire structure will now be briefly discussed.

In illustrated embodiment, it is possible to implement an automatic transmission that has seven forward speeds and one reverse speed in which the automatic transmission is relatively simple and has a small number of constituent elements. In particular, three groups of simple planetary gear units and five friction elements are provided that can provide an adequate speed reduction ratio.

Effects based on the use of three groups of simple planetary gear units will now be briefly discussed.

In comparison with using a double pinion, configuring the transmission from three groups of simple planetary gear units improves transmission efficiency and reduces gear noise. In addition, there is no need to reduce the pinion diameter and gear durability is therefore increased.

Effects based on the ratio coverage of forward speeds will now be briefly discussed.

The term "ratio coverage" (comparative gear width) refers to the fraction obtained by dividing the speed reduction ratio of the minimum step by the speed reduction ratio of the maximum step. The larger this value is, the greater the compatibility is between the forward acceleration and fuel efficiency during high-speed cruising, and the higher the degree of freedom is for designing the gear ratio at each of the forward steps. The specific numerical values in illustrated embodiment are a speed reduction ratio of 5.375 for the first forward speed, and a speed reduction ratio of 0.737 for the seventh forward speed. Therefore, the ratio coverage for speeds 1 to 7 is 7.29, and sufficient ratio coverage can be ensured. Consequently, the engine speed width is less than that of, for example, a gasoline engine when used as a power source, and the transmission can be used on a vehicle on which a diesel engine having a high torque, as compared at the same displacement, is mounted as a power source.

Effects based on standard deviation that corresponds to the V1000 will now be briefly discussed.

The standard deviation can be made into an extremely small value. (For example, it is 0.047 in the example of the gear ratio according to the illustrated embodiment.) It is therefore possible to obtain an automatic transmission in which the defensive ranges of speeds at each gearshifting step are equal to each other and in which, in particular, rhythmic upshifting can be achieved and excellent drivability properties can be obtained during the difficult selection of the speed reduction ratio on ascending and descending roads.

Effects based on the number of switchovers among friction elements during gearshifting will now be briefly discussed.

(i) Torque control and the engagement/release timing of friction elements during gearshifting becomes complicated when, for example, one or more friction elements are released and two or more friction elements are engaged, or when two or more friction elements are released and one or more friction elements are engaged. In view of this, it is preferable to release a single friction element and to engage another friction element in order to prevent gearshifting control from being complicated. In other words, it is preferable to avoid multiple changes of the engagement states of the friction elements. In illustrated embodiment, the gears are shifted from the first forward speed to the second forward speed in a state in which the first friction element A remains engaged, from the second forward speed to the fifth forward speed in a state in which the third friction element C remains engaged, and from the fifth forward speed to the seventh forward speed in a state in which the fifth friction element E remains engaged. In other words, shifting of all the gears to an adjacent gear step from the first forward speed to the seventh forward speed is accomplished by replacement gearshifting in which a single friction element is released and another friction element is engaged. Control during gearshifting is thereby prevented from becoming complicated.

The effects based on layout will now be briefly discussed.

(i) In the automatic transmission according to illustrated embodiment, no three-layer coupling members are present in an area at the outside diameter of the three groups of planetary gear units, as shown in the schematic view in FIG. 1. Lubricating oil is thereby made less likely to accumulate, and fuel efficiency is improved by reducing the friction.

(ii) As is also shown in the schematic view according to FIG. 1, the rotating members that pass through the area at the outside circumference of the planetary gear unit are single-layered structures. In an automatic transmission, lubricating oil is constantly supplied to gears, bearings, and the like, which are rotating elements, in order to provide cooling and lubrication. This lubrication is generally provided by centrifugal force from the axial center. If discharge of the lubricating oil along the outside circumference is impeded, the oil temperature rises and durability is reduced for the friction elements, bearing members and the like (not shown). In illustrated embodiment, the rotating members that pass through the area at the outside circumference of the planetary gear unit are single-layered structures, as described above. Therefore, discharge of the lubricating oil is not impeded, any increase in oil temperature is inhibited and durability is enhanced.

(iii) A member that passes through the area at the inside diameter of the three groups of planetary gears is at most a biaxial structure. Consequently, in contrast to U.S. Pat. No. 6,648,791, the degree of design freedom is enhanced because the dimensions of the sun gears are unrestricted and there is a large degree of freedom for the gear ratios of the planetary gears.

(iv) The automatic transmission according to illustrated embodiment is an automatic transmission in which input is made from one side of a planetary gear unit and output is made from another side. Therefore, the transmission can also be used in a front-wheel drive vehicle or a rear-wheel drive vehicle, and the range of applications of automatic transmissions can be expanded.

Results based on considerations related to the number of friction elements

Among the friction elements in illustrated embodiment, the first friction element A acts as a brake. In other words, in comparison with a case in which the number of clutches is increased by providing a brake, it is possible to suppress an increase in the number of rotational seal rings and centrifugal cancellation mechanisms, and to suppress an increase in the number of parts and the axial dimensions while improving fuel efficiency.

General Interpretation of Terms

In understanding the scope of the present invention, the term "comprising" and its derivatives, as used herein, are intended to be open ended terms that specify the presence of the stated features, elements, components, groups, integers and/or steps, but do not exclude the presence of other unstated features, elements, components, groups, integers and/or steps. The foregoing also applies to words having similar meanings such as the terms, "including", "having" and their derivatives.

While only selected embodiments have been chosen to illustrate the present invention, it will be apparent to those skilled in the art from this disclosure that various changes and modifications can be made herein without departing from the scope of the invention as defined in the appended claims. For example, the size, shape, location or orientation of the various components can be changed as needed and/or desired. Components that are shown directly connected or contacting each other can have intermediate structures disposed between them. The functions of one element can be performed by two, and vice versa. The structures and functions of one embodiment can be adopted in another embodiment. It is not necessary for all advantages to be present in a particular embodiment at the same time. Every feature which is unique from the prior art, alone or in combination with other features, also should be considered a separate description of further inventions by the applicant, including the structural and/or functional concepts embodied by such feature(s). Thus, the foregoing descriptions of the embodiments according to the present invention are provided for illustration only, and not for the purpose of limiting the invention as defined by the appended claims and their equivalents.

What is claimed is:

1. An automatic transmission comprising:
   an input shaft;
   an output shaft;
   a first planetary gear unit including a first sun gear that is always fixed, a first carrier supporting a first pinion in meshed engagement with the first sun gear and a first ring gear in meshed engagement with the first pinion;
   a second planetary gear unit including a second sun gear, a second carrier supporting the second pinion in meshed engagement with the second sun gear and a second ring gear in meshed engagement with the second pinion, with the first carrier and the second ring gear being connected to form a rotating member;
   a third planetary gear unit including a third sun gear that is always connected to the input shaft, a third carrier supporting a third pinion in meshed engagement with the third sun gear and that is always connected to the output shaft and a third ring gear in meshed engagement with the third pinion;
   a first friction element arranged to selectively stop rotation of the second carrier;
   a second friction element arranged to selectively connect the second sun gear and the third carrier;
   a third friction element arranged to selectively connect the second carrier and a first rotating member formed by the first and third ring gears being connected rotate together as a unit;
   a fourth friction element arranged to selectively connect the second sun gear and the third sun gear; and
   a fifth friction element arranged to selectively connect the second carrier and the third sun gear,
   the first to fifth friction elements being operatively arranged with respect to the first, second and third planetary gear units to selectively establish at least seven forward speeds and one reverse speed by combining simultaneous engagement of two out of the first to fifth friction elements for transmitting torque from the input shaft to the output shaft.

2. The automatic transmission as claimed in claim 1, wherein
   the five friction elements are further arranged to establish the seven forward speeds by
      simultaneously engaging the first friction element and the second friction element to establish one of the seven forward speeds,
      simultaneously engaging the first friction element and the third friction element to establish one of the seven forward speeds,
      simultaneously engaging the second friction element and the third friction element to establish one of the seven forward speeds,
      simultaneously engaging the third friction element and the fourth friction element to establish one of the seven forward speeds,
      simultaneously engaging the third friction element and the fifth friction element to establish one of the seven forward speeds,
      simultaneously engaging the second friction element and the fifth friction element to establish one of the seven forward speeds, and
      simultaneously engaging the first friction element and the fifth friction element to establish one of the seven forward speeds.

3. The automatic transmission as claimed in claim 2, wherein the first to fifth friction elements are further arranged to establish the reverse speed by simultaneously engaging the first friction element and the fourth friction element.

* * * * *